United States Patent [19]

Kudelski

[11] Patent Number: 4,508,292

[45] Date of Patent: Apr. 2, 1985

[54] TAPE LOOP SENSING ARM AND TAPE GUIDE FOR MAGNETIC TAPE RECORDING AND PLAYBACK MACHINES

[75] Inventor: Stefan Kudelski, Le Mont-sur-Lausanne, Switzerland

[73] Assignees: Ampex Corp., Redwood City, Calif.; Kudelski, S.A., Lausanne, Switzerland

[21] Appl. No.: 533,093

[22] Filed: Sep. 15, 1983

[30] Foreign Application Priority Data

Sep. 17, 1982 [GB] United Kingdom ................ 8226575

[51] Int. Cl.³ ...................... B65H 59/38; G11B 15/32
[52] U.S. Cl. .................................. 242/190; 226/114; 226/195; 242/75.3

[58] Field of Search .......................... 242/76, 201–206, 242/208–210, 75.3, 189, 190; 226/113, 114, 195

[56] References Cited

U.S. PATENT DOCUMENTS 3,424,391 1/1969 DiVeto ............................ 242/76 X Primary Examiner—Leonard D. Christian
Attorney, Agent, or Firm—Harry G. Thibault; Joel D. Talcott

[57] ABSTRACT

A tape loop sensing arm comprises an arm member (6) which carries a rotary guide (5), comprising a cylindrical guide member (74) mounted on a spindle (65) which pivots on an axle (64) aligned radially with respect to the axis of rotation of the arm member.

8 Claims, 2 Drawing Figures

TAPE LOOP SENSING ARM AND TAPE GUIDE FOR MAGNETIC TAPE RECORDING AND PLAYBACK MACHINES

BACKGROUND TO THE INVENTION

This invention generally relates to tape guides for use in magnetic tape recording and playback machines and particularly concerns a tape guide constituting part of a tape loop sensing arm in a tape transport forming part of a machine for recording or playing back video signals.

In most kinds of magnetic tape recording and playback machines, magnetic tape is transported along a path defined by a plurality of guides from a supply reel of tape past a recording head to a take-up reel. The tape is usually driven by a capstan engaging the tape at an appropriate location along the path, the location depending on the particular machine. The supply and take-up reels are driven, usually by means of motors which are controlled servomechanically to maintain an appropriate tension in the tape. In video machines, the tape path extends adjacent a rotary scanner which, for helically scanning machines, comprises a drum around which the tape is guided in a helical path so as to be scanned in oblique tracks by a scanning head driven at high speed around the periphery of the drum so as to provide scanning of the tape along a plurality of oblique tracks on the tape. In all kinds of magnetic tape recording and playback machines it is desirable that the speed of the tape be accurately controlled but particularly in video machines it is, as is well-known, highly desirable to control the motors used for driving the supply and take-up reels to maintain a substantially constant tape tension and to avoid loading the capstan by the reels.

In order to monitor the tension of the tape along a section thereof adjacent one or other of the supply and take-up reels, it is known to provide an arm which is provided at or near one end and carries at or near its other end a roller guide around which the tape extends. By means of guides upstream and downstream of the arm, the tape path extending around the guide carried on the arm forms a small loop. The pivoting of the arm enables the guide carried by the arm to move along, for example, an arcuate path and the arm is usually biassed so as to tend to make the loop of the tape of maximum length. It is usual to provide two such pivoted arms and associated guides, one each being disposed near the respective supply or take-up reel. Considering the arm associated with the supply reel, for the sake of example, as the tension in the loop of tape formed by the guide carried on the pivoted arm increases, the pressure of the tape on the guide will increase so as to move the guide along said arcuate path, which usually extends in a plane to which the axis of rotation of the guide and the axis about which the arm carrying the guide can pivot are normal. The consequential pivoting of the arm can be sensed, by a variety of means not directly relevant to the present invention, to obtain a signal representing the loop length and thereby the tape tension. As is also known, such a signal can readily be used as part of a servo-loop controlling the motor for the supply reel to accommodate variation in the tape tension. Thus the supply reel's motor can be driven so as to accelerate or decelerate as necessary and thereby to relax or increase the tension applied to the tape by the supply reel and thereby to maintain the tape tension, as monitored by the pivoted arm, substantially constant. It will be readily apparent that converse considerations apply for the tension sensing arm associated with the take-up reel and that the circuits for driving the supply and take-up reels include mode switching arrangements for controlling the motor differently according to the particular mode of operation of the transport that may be required, such as for example high speed traversal or rewind etc.

Owing to the considerable pressure exerted by the tape on the guide carried by the tension sensing arm, the bearings for the guide are liable to wear and it is found in practice that if the rotary guide is mounted by simple bearings on a post, the bearings develop undesirable play such that the tape guiding is inaccurate. Moreover, the wear of the tape can be considerable and it would be generally desirable to be able to accommodate slight variations in the height or tension in the tape so as to reduce wear without substantially affecting the accuracy of the sensing arm.

SUMMARY OF THE INVENTION

It is therefore one object of the present invention to provide an improved rotary tape guide in which wear on and consequent play in the bearing assembly for the guides is reduced.

It is another object of the invention to provide an improved loop sensing arm of which the tape guide is of improved construction.

These and other objects of the invention may be fulfilled by a sensing arm of which the tape guide is rotatable about, usually, an upright axis relative to the arm and in which a spindle with respect to which the rotary guide member in mounted for rotation is permitted pivoting movement about an axis which is normal to the rotary axis of the rotary guide member. In other words, the rotary axis can tilt. It is preferable to choose this axis so that the pivoting movement of the spindle and thereby the tilting, or pivoting movement, of the guide occurs in a plane which for a mean position of the sensing arm is parallel to the plane of the tape extending from the guide in a sense, along the tape path, away from the associated reel. Thus the guide can be permitted, in effect, to float in this plane yet despite the limited pivotal movement of the guide, the top and bottom of the rotary guide remain at the same distance from the pivot axis of the rotary arm and the loop lengths for the top and bottom of the tape remain the same, avoiding any significant disturbance to the guiding of the tape. Moreover, the pivoting of the guide in this plane has substantially no effect on the angular position of the pivoting sensing arm for a given loop length and therefore inaccuries in the sensing of the loop tension may be avoided.

The foregoing and other objects of the invention will be apparent from the following description of a particular embodiment of the invention.

DESCRIPTION OF THE PREFERRED EMBODIMENT

Figure 1:
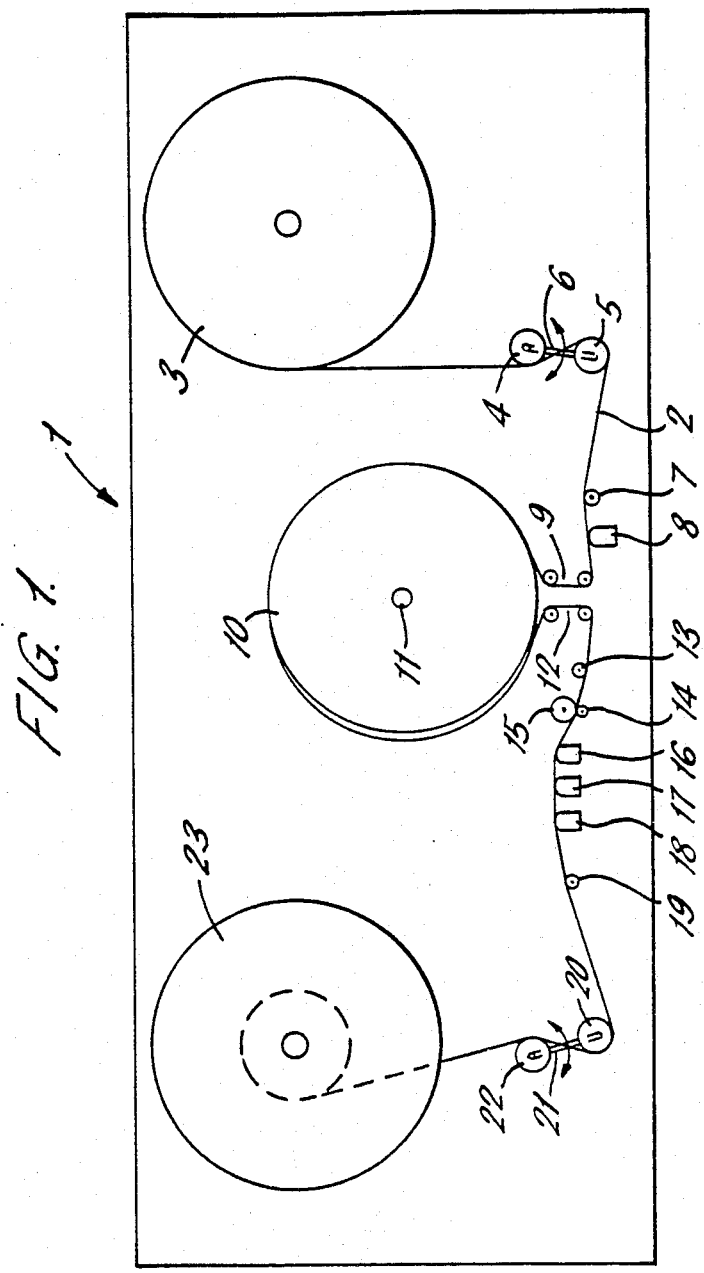
FIG. 1 is a schematic diagram of a tape transport in which a sensing arm having a guide according to the invention may be employed.

FIG. 1 illustrates in simplified and diagrammatic form the main elements of a tape transport forming part of a battery operated portable video tape recorder. It will be understood that the invention is not intended to be confined to use in such a recorder.

In the apparatus 1 shown in FIG. 1, a magnetic tape 2 is, in the normal mode of operation of the apparatus, supplied from a reel 3 driven by a servocontrolled motor (not shown). The tape passes around a guide 4 and is formed into a shallow loop by a rotary guide 5 carried at one end of a sensing arm 6 pivoted, coaxially with the guide 4, for arcuate movement in the general plane of movement of the tape. The loop extends from the guide 5 to another guide 7. From the guide 7 the tape extends past a video erase head 8 and then around a pair of upright rotary guides 9 which serve to guide the entry of the tape into a helical path extending around a scanning drum 10 which is slightly tilted, the axis 11 of the drum being oblique to the general plane of movement of the tape. The end of the helical path of the tape around the drum is defined and controlled by a pair of upright rotatable cylindrical guides 12. The pairs of guides 9 and 12 define an "omega" wrap of the tape around the scanning drum, which includes, as is usual, a scanning head mounted on a carrier driven around the periphery of the drum so that the tape can be scanned in a multiplicity of parallel tracks each extending obliquely, at a slight angle, relative to the length of the tape in a generally known manner.

From the exit guides 12 the tape proceeds past a guide 13 and a capstan 14 which is associated with a pinch roller 15, the tape path then extending past ordinary erase, audio and control track heads 16 to 18. The tape passes around another fixed guide 19 which defines one end of a take-up loop the length of which is sensed by a rotatable roller guide 20 mounted at one end of a sensing arm 21 pivoted so that, in a manner similar to the arm 6, the arm 21 can execute a pivotable movement in a general plane of movement of the tape. The tape path extends around a guide 22 coaxial with the pivot of the arm 21 and the tape is taken up by a reel 23.

For the sake of simplicity, the various controls and motors for the scanning head, the capstan and the take-up reel have likewise been omitted.

As is well-known, in order to control the tension in the tape, it is appropriate to monitor the lengths of the loops engaged by the tape guides of the sensing arms 6 and 21 and to control the energisation of the motors for the supply and take-up reels accordingly. Although the manner in which this may be achieved does not form any part of the present invention, it will be apparent that, for example, an increase in the tape tension in the loop engaged by the guide roller 5 at the end of the sensing arm 6 will cause the arm 6 to pivot. The pivoting movement is usually resisted by a restoring spring (not shown). The pivoting movement may be sensed by a variety of known means and used as an error control signal in the servomechanical control of the supply reel 3 in order, in this particular case, to increase the speed of the reel and restore the tape tension to the desired mean value.

It is desirable that the tape makes an approximately 90° turn about the guide 5 (or the guide 20) when the associated arm is in its means position and the tape is at its required tension.

Figure 2:
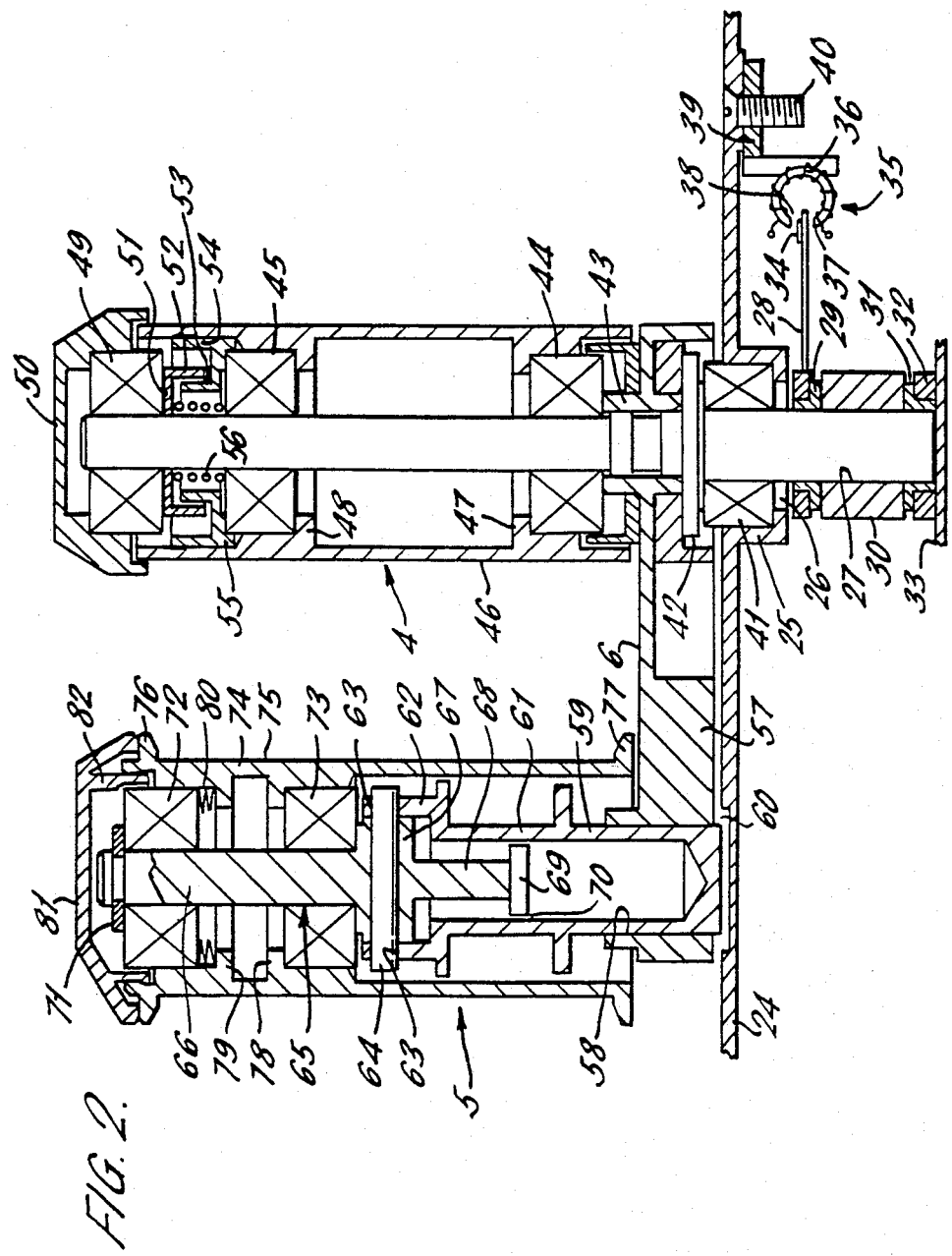
FIG. 2 is a slightly simplified sectional view of a sensing arm including a rotary guide which is mounted on the arm in accordance with the present invention.

FIG. 2 illustrates the assembly of the guide 4, the guide 5 and the arm 6, including the mechanical parts of the sensor which provides an indication of the angular position of the arm 6.

The deck 24 of the recorder is dished at 25, the bottom of the dish having a central aperture 26 for the accommodation of an upright shaft 27 which is disposed normal to the general plane of the arm 6.

The shaft 27 extends downwardly from the sensing arm below the aperture 26 in the dish 25. On the lower part of the shaft 27 is mounted a sector shaped insulating plate 28, disposed generally parallel to but below the sensing arm 6. The plate 28 is carried on a collar 29 rigidly secured to the shaft 27. Below the collar 29 is a bushing 30 below which is a collar 31 resting on a seat 32 disposed on a lower deck 33.

The plate 28 forms part of a position sensing device. The plate 28 is of a rigid synthetic plastic and carries shaped strips 34 of a lossy material, which may be a non-magnetic metal such as copper or a ferrite. The plate 28 cooperates with a magnetic sensing head 35 constituted by a coil 36 wound on a core 37 formed with a gap 38 into which the plate 28 extends. The core 37 is carried by a bracket 39 secured by a screw 40 to the deck 24.

Although it is of no consequence in relation to the present invention, the coil is intended to form part of an oscillator circuit of which the quality factor (Q) is altered as the plate 28 moves in the gap 38, the strips 34 being shaped to provide linearity of the relationship between the output of an oscillator of which the coil forms part and the variation in tape tension which produces the pivoting movement of the arm 6.

The dish 25 accommodates a bearing 41 for the shaft 27. The shaft has a collar 42 which is supported by the bearing 41 and supports the arm 6 which at its inner end includes a hollow bush 43 keyed to the shaft 28.

Supported by the bush 43 is a bearing 44, which constitutes the lower of two bearings 44 and 45 by which a cylindrical guide member 46 is rotatably mounted, for rotation about its longitudinal axis, on the shaft 27. The cylindrical guide member 46 has internal flanges 47 and 48 engaging the bearings 44 and 45.

The top of the shaft 27 is received in a bearing 49 which is retained within a cap 50. Below the bearing is an annular plate 51 with a downwardly extending peripheral flange 52, which extends between two upwardly extending flanges 53 and 54 of an annulus 55 which is secured within the guide member 46 and supports the bearing 45. The flanges 52, 53 and 54 constitute a dust trap. Between the plate 51 and the bearing 45 is a helical compression spring 56 encircling the shaft 27. For rigidity of the shaft 27, the cap 50 may be secured to a suitable frame member (not shown) extending to the deck 24 such as not to interfere with the feeding of the tape.

At its outer end, the arm 6 has a portion 57 of greater thickness than the remainder of the arm 6. This portion 57 has a bore 58 in which is supported an upright hollow post 59. The post extends slightly below the bottom surface of the portion 57 and the upper surface of the deck 24 is provided with an arcuate recess 60 so as to provide adequate clearance between the bottom of the post 59 and the deck over the range of arcuate movement which the end of the sensing arm will normally execute.

The post 59 has a cylindrical wall 61 which at its upper end is shaped to form an inverted yoke 62. Extending across the yoke and secured as by means of adhesive in diametrically opposite bores 63 in the yoke 62 in an axle 64 which is aligned in a direction parallel to the arm 6 and disposed thereby in a direction radially of the pivot axis of the arm, said pivot axis being defined by the axis of the shaft 27.

The axle 64 provides a pivot for a spindle 65 which has an upper part 66, a middle part 67, of somewhat greater diameter, and a lower part 68. The middle part 67 of the spindle 65 constitutes a hub for the axle 64 and thereby the spindle 65 can pivot about the axis defined by the axle 64. The lower part 68 of the spindle 65 extends downwardly into the interior of the post and is provided with a foot 69 which has a small clearance between it and the wall 61 of the post 59. The clearance cannot be explicitly shown in the drawing, because the crucial dimension is normal to the plane of FIG. 2, but the wall 61 and the foot 59 being cylindrical, the clearance is indicated by the gap 70 between the foot 69 and the wall 61 as shown in the drawing.

At the upper end of the spindle 65, the spindle carries a collar 71. Below the collar and surrounding the spindle are two bearings 72 and 73. These provide a rotary mounting for a generally cylindrical guide member 74 around which the tape is to pass. The guide member 74 has a generally cylindrical outer surface 75 and at each end the guide member has rims 76 and 77 which restrict the vertical movement of the tape on the guide member. At its inner surface the guide member 74 has internal ribs 78 and 79, which extend between the bearings 72 and 73 and of which the rib 79 supports a packing ring 80 immediately beneath the upper bearing 72.

The guide member 74 has a top cover 81 which has a downwardly extending annular rib 82 fitting within the inner periphery of the cylindrical part 75 of the member 74.

The construction aforedescribed permits the guide member 74 to rotate about an axis in a plane tangential to the arcuate path of the respective end of the sensing arm 6 and also permits the guide to rock in the same plane but only in this plane. The pivotal rocking movement is limited to a few degrees by means of the foot 69 and the interior of the wall 61 of the post 59.

It will be appreciated that the arm 6 and the axle are, for that position of the arm associated with the nominal or desired tape tension, at right angles to that section of the tape path which extends away from the guide 5 in the sense away from the reel 3. Thus, for this position of the sensing arm, the guide can "float" in the plane of the tape without altering, or significantly altering, the effective length of the sensing arm. Since the pivot axis of the guide 5 is central with respect to the tape, the effective length of the arm is not significantly altered even when the arm varies from its mean position and the angle between it and the tape path is greater than a right angle. The effective length of the arm is the distance between the axis of the shaft 27 and the location where the tape leaves the guide 5 (when the assembly is used in conjunction with a supply reel).

The accuracy of the sensing arm is significantly assisted by the provision of the rotary guide 4 which is fixed in position coaxially with the pivot axis of the arm 6.

Although a specific form of the invention has been described with reference to a tape sensing arm having a rotary guide thereon, various modifications may be made without departing from the invention. In particular, the spindle for the guide 5 may be gimballed, i.e. mounted on a ball disposed centrally of the guide 5 and disposed in a socket which permits rotation of the ball for a limited extend and accordingly the preferred pivoting of the guide 5.

I claim:

1. A tape loop sensing arm for guiding tape and for pivotal movement in response to alteration of a tape loop, said arm comprising:
   pivot means defining a pivot axis;
   an arm member disposed on said pivot means for rotation about a first axis;
   a cylindrical tape-engaging guide member;
   support means comprising a spindle defining said rotary axis;
   bearing means mounting said guide member for rotation about said spindle;
   means for mounting said spindle for pivotal movement about said pivot axis;
   said support means mounting said guide member on said arm member for rotary tape guiding movement about a rotary axis generally parallel to said first axis, and
   permitting pivoting of the guide member about a pivot axis normal to said first axis without significant alteration of the effective sensing length of the arm.

2. A tape loop sensing arm according to claim 1 in which said means for mounting comprises a post supporting an axle on which said spindle is mounted.

3. A tape loop sensing arm according to claim 1 or claim 2, further comprising means for limiting said pivotal movement.

4. A tape loop sensing arm according to claim 2, further comprising an extension of said spindle, said post having a hollow interior into which said spindle extends to define a clearance dimension between said extension and said post.

5. A tape loop sensing arm according to claim 1 or claim 4 further comprising a rotary tape guide mounted for rotation coaxially with said first axis.

6. A tape loop sensing arm comprising a pivoting support, a rotary guide member adapted to rotate about a rotary axis and carried by said support for movement in a plane generally normal to the rotary axis in response to changes in the tension of a tape engaged by the guide member and means for mounting the guide member on the support, said means for mounting including:
   a spindle defining said rotary axis;
   bearing means mounting said guide member for rotation about said spindle; and
   means for mounting said spindle for pivotal movement in said plane, permitting limited pivotal tilting movement of said rotary axis.

7. In a tape transport including scanning means, tape supply means and take-up means and guide means for defining a path for a tape from said supply means past said scanning means to the take-up means, said guide means including at least one rotatable arm including a tape guide member mounted on said arm for movement by said arm along an arcuate path in a predetermined plane, the improvement wherein said tape guide comprises:
   a spindle;
   means for mounting said spindle with respect to said arm, said means for mounting including a pivot permitting said spindle to execute pivoting movement in a plane tangential to said arcuate path;

means for limiting said movement;

a cylindrical guide member surrounding and coaxial with said spindle; and bearing means for mounting said cylindrical guide member for rotation with respect to said spindle.

8. The improvement set forth in claim 7 in which said means for mounting defines a pivot axis extending centrally of said cylindrical guide member.

* * * * *